UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS, A CORPORATION OF MASSACHUSETTS.

ABRASIVE MATERIAL AND METHOD OF MAKING IT.

954,766.

Specification of Letters Patent. Patented Apr. 12, 1910.

No Drawing. Application filed December 26, 1908. Serial No. 469,309.

*To all whom it may concern:*

Be it known that I, LEWIS E. SAUNDERS, a citizen of the United States, residing at Niagara Falls, in the county of Niagara and State of New York, have invented certain new and useful Improvements in Abrasive Material and Method of Making It, of which the following is a specification.

This invention relates to the preparation in the electric furnace of an aluminous material adapted for use as an abrasive, and possessing certain novel distinguishing characteristics and properties as hereinafter set forth.

In the preparation in the electric furnace of abrasive materials consisting largely of alumina, it has been customary to calcine bauxite to expel the water of hydration, and thereafter to fuse the material in an electric furnace between carbon electrodes, usually with the addition to the charge of small proportions of carbon added for the purpose of reducing the oxids of iron, silicon and titanium. The resulting product varies widely in color, usually of various shades of red, brown or gray, and contains varying proportions of iron, silicon, titanium and calcium. As above pointed out it is produced under reducing conditions.

I have discovered that under certain conditions as hereinafter described I am enabled to produce in the electric furnace a material which is blue or blue-black in color although of varying shades, which exhibits a strong tendency to crystallization and possesses qualities adapting it for use as an abrasive in certain particular relations. To prepare this material I may proceed as follows: Commercial bauxite containing both iron and titanium is ground and calcined, and is thereafter melted in a suitable electric furnace with precautions to avoid strongly reducing conditions; that is to say, no carbon is added to the charge, and the charge is preferably melted as rapidly as practicable between graphite electrodes.

The furnace may be of the type shown in U. S. Patent No. 775,654, issued November 22, 1904, to A. C. Higgins.

If iron and titanium be present as oxidized compounds and in proper proportions the product will be found to be blue or blue-black in color and to possess the properties and characteristics hereinafter set forth.

It is essential to the production of an abrasive having the desired qualities that the iron should be present in excess of the titanium, and it is preferable that the percentage by weight of iron oxid should be at least double that of the titanium oxid, although it may very considerably exceed this proportion. Without restricting the invention to the proportions therein indicated, I give the following analysis of a blue-black aluminous abrasive possessing all of the desirable characteristics below mentioned:

| | |
|---|---:|
| $Al_2O_3$ | 82.87 |
| $TiO_2$ | 3.10 |
| $Fe_2O_3$ | 12.04 |
| $SiO_2$ | 1.10 |
| CaO | 0.89 |
| | 100.00 |

The absolute percentage of iron and titanium oxids depends upon the shade of color desired and also upon the percentage of silica, the percentage of iron and titanium necessary to produce a given shade increasing with the percentage of silica. It is advisable therefore to select a bauxite low in silica in order that the proportions of iron and titanium may not be excessive or sufficient to affect undesirably the abrasive qualities of the product. If the material be substantially free from silicon the titanium oxid may be as low as 1 to 2 per cent., the iron oxid being at least 2 to 4 per cent. If silica be present in substantial proportions an increase in the per cent. of titanium oxid and iron oxid is necessary, these increasing preferably in approximately the proportion of two parts of iron oxid to one part of titanium oxid, and the amount of increase depending on the proportion of silica present. For example, with 4 per cent. of silica a compound having the desired properties may contain 4.5 per cent. of titanium oxid and 9 per cent. of iron; or with 8 per cent. of silica the mixture may contain 6 to 8 per cent. of titanium oxid and 12 to 20 per cent. of iron oxid. In general, is is difficult or impossible to obtain a suitable material with silica in excess of 8 per cent.

Proper proportions of iron and titanium may be secured by mixing iron ore or mill scale with bauxite deficient in iron, or by mixing different grades of bauxite in proper proportions as indicated by analysis. In case the bauxite is deficient in titanium, this may be added in the form of titaniferous bauxite or other titanium ores or compounds.

The material produced as above described is taken from the furnace in the form of pigs or masses having the characteristic blue or blue-black color and exhibiting a decided tendency to crystallization, transparent plate-like crystals of clear blue color exceeding two centimeters in length being found at times in cavities of the mass. The crushed and graded abrasive is found to possess superior holding qualities for glue or other adhesives, and is therefore particularly adapted for the preparation of abrasive paper or cloth; it is also particularly suited in the qualities of temper and hardness to the class of work to which abrasive paper or cloth is applied, as for example finishing leather, and certain classes of metal work, more particularly disk grinding.

As a probable explanation of the development of the blue or blue-black color under the conditions specified, it may be pointed out that the compound $Fe_2TiO_4$ is violet, and may perhaps be formed in the molten mass and impart its color thereto.

I claim:—

1. The herein described electric furnace product, comprising a previously molten mixture containing upward of 60 per cent. of oxid of aluminum, from 1 to 8 per cent. of titanium oxid, and from 2 to 20 per cent. of iron oxid, the oxids of iron and titanium being present in the proportion and amount required to produce a lustrous product having a blue or blue-black color.

2. The herein described electric furnace product, comprising a previously molten mixture containing upward of 60 per cent. of oxid of aluminum, from 1 to 8 per cent. of titanium oxid, and from 2 to 20 per cent. of iron oxid, the oxid of iron being in approximately twice the proportion by weight of the titanium oxid, and the oxids of iron and titanium being present in the amount required to impart a blue or blue-black color to the mass.

3. The method of preparing a material suitable for use as an abrasive, which consists in melting in an electric furnace a mixture containing upward of 60 per cent. of oxid of aluminum, from 1 to 8 per cent. of titanium oxid, and from 2 to 20 per cent. of iron oxid, the oxids of iron and titanium being present in the proportion and amount required to impart a blue or blue-black color to the mass.

In testimony whereof I affix my signature in presence of two witnesses.

LEWIS E. SAUNDERS.

Witnesses:
R. P. CAPRON,
HENRY DUCKWORTH.